United States Patent [19]
Hattori

[11] Patent Number: 4,560,370
[45] Date of Patent: Dec. 24, 1985

[54] V-BELT POWER TRANSMISSION

[75] Inventor: Torao Hattori, Wako, Japan

[73] Assignee: Honda Giken Kogyo Kabushiki Kaisha, Tokyo, Japan

[21] Appl. No.: 669,177

[22] Filed: Nov. 7, 1984

[30] Foreign Application Priority Data

Nov. 7, 1983 [JP] Japan .............................. 58-207539
Dec. 15, 1983 [JP] Japan .......................... 58-193335[U]

[51] Int. Cl.$^4$ .............................................. F16G 5/20
[52] U.S. Cl. .................................... 474/201; 474/237
[58] Field of Search ............... 474/201, 202, 242, 244, 474/265, 237

[56] References Cited

U.S. PATENT DOCUMENTS

| | | | |
|---|---|---|---|
| 4,371,361 | 2/1983 | Glacosa | 474/201 |
| 4,457,742 | 7/1984 | Hattori et al. | 474/201 |
| 4,512,753 | 4/1985 | Hattori | 474/201 X |

FOREIGN PATENT DOCUMENTS

| | | | |
|---|---|---|---|
| 0054838 | 3/1984 | Japan | 474/201 |
| 0050252 | 3/1984 | Japan | 474/201 |

Primary Examiner—Stephen J. Novosad
Assistant Examiner—Thuy M. Bui
Attorney, Agent, or Firm—Lyon & Lyon

[57] ABSTRACT

A power transmission V-belt comprising an endless belt, a plurality of V-shaped metal members and a plurality of intermediate members. The endless belt is mounted between drive and driven pulleys. The plurality of V-shaped metal members are arranged on the endless belt serially in the longitudinal direction thereof. Each of the V-shaped metal members is formed with a groove to provide a contacting surface in contact with an inner surface of the endless belt. The plurality of intermediate members are positioned at inner side of the endless belt. Each of the intermediate members is interposed between neighboring V-shaped metal members. Each of the V-shaped metal members has both sides in running direction of the endless belt and is formed with receiving surfaces for receiving one of the roller members. The receiving surfaces are in arcuate form. The radius of curvature of one of the receiving surfaces is substantially equal to that of the intermediate members. The radius of curvature of the outer surface is larger than that of the one receiving surface.

6 Claims, 6 Drawing Figures

V-BELT POWER TRANSMISSION

BACKGROUND OF THE INVENTION

The present invention relates to a V-belt type transmission to be used with a continuously variable transmission for a vehicle or the like and, more particularly, to a V-belt transmission in which a number of V-shaped metal members having outward contact surfaces to contact with an endless metal belt are arranged on the metal belt serially in the longitudinal direction of the metal belt thereby to construct a V-belt as a whole so that the V-belt is made to run under tension between V-pulleys at drive and driven sides to effect the power transmission.

The V-belt transmission to be used in a continuously variable transmission is suitable for transmitting a large power because it provides relatively high frictional force. On the contrary, the V-belt has a defect that its size is enlarged if it is made of rubber.

In order to eliminate this disadvantage, the V-belt transmission made of metal has been developed.

The aforementioned V-shaped metal members have outward contact surfaces to come into abutment against the endless metal belt and arranged in a predetermined number along the whole length of the endless metal belt so that they are forced into contact with one another to apply a tension and a suitable fastening force to the metal belt.

In the Japanese Patent Application No. 58-70920, a V-belt transmission of the above type has been proposed, in which each of roller members is disposed inside of the metal belt and sandwiched between each adjoining two of V-shaped metal members. Each of the metal members has both sides, in longitudinal direction of the metal belt, formed with arcuate recess for receiving the roller member. Each of the arcuate surfaces has a radius of curvature larger than the radius of the roller members so that the wedge effect for pressing the roller members in the longitudinal direction of the metal belt may be exhibited in accordance with the successive engagement of the metal members with the V-shaped groove of a V-pulley. As a result, the gaps between the neighboring two of the metal members is enlarged through the sandwiched one of the roller members to establish a pressure as a whole in the direction to increase of radius of revolution locus of the metal members thereby to strengthen the pressure at the outward contact surfaces of each of the metal members onto the metal belt. According to this proposal, however, in order to exert a tension upon the metal belt accompanying the revolutions of the pulleys and to ensure the power transmission efficiently with smooth revolutions, it is required to bring consecutively and smoothly the metal members into engagement with the V-grooves of the pulleys and to make uniform engaging positions with respect to every metal member.

With respect to another aspect of the conventional V-belt of this type, the size of the whole length of the belt is adjusted by the V-shaped metal members. However, these V-shaped metal members are difficult to provide an accurate thickness, because they are specially shaped into a plate, so that it is troublesome to adjust the size of the total length of the belt.

According to the V-belt of this type, a metal V-belt is assembled by first assembling a predetermined total number of V-shaped metal members consecutively or simultaneously onto a metal belt and by consecutively or simultaneously pressfitting rollers or the like as the intermediate members between the adjacent two of the V-shaped metal members thereby to apply a proper fastening force to the metal belt. However, since the V-shaped metal members do not have uniform thickness with one another, and since all the metal belts do not have an equal internal diameter, it is necessary to further adjust the fastening force of the resultant metal belt.

SUMMARY OF THE INVENTION

The present invention has an object to provide a transmission which can satisfy those requirements and is characterized in that the radius of curvature of one of the receiving surfaces at both the sides of the V-shaped metal members of the aforementioned proposal is made substantially equal to the radius of the roller members whereas the radius of curvature of the other receiving surface is made larger than that of the one receiving surface so that the aforementioned wedge effect may be attained.

Further, the present device contemplates to provide a V-belt transmission formed of metal, which can conduct the adjustment of the whole length and, accordingly, the fastening force with ease and in high accuracy and which is simple in construction so that it can be assembled with ease at low cost.

DESCRIPTION OF THE PREFERRED EMBODIMENTS

Figure 1:
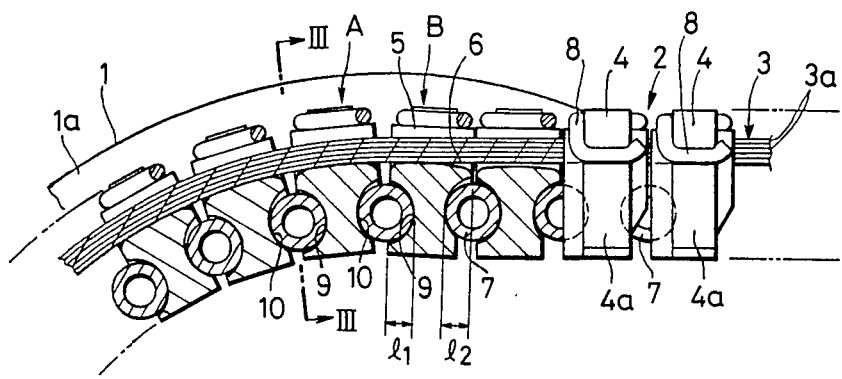
FIG. 1 is a partially sectional side elevational view showing a first embodiment of the V-belt according to the present invention.
Figure 2:
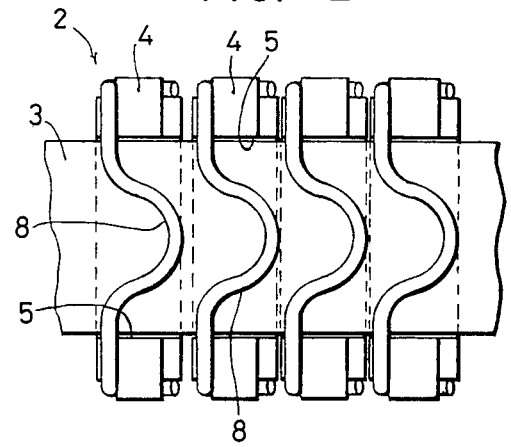
FIG. 2 is a top plan view of the same.
Figure 3:
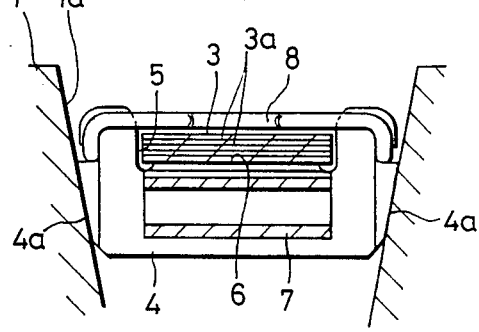
FIG. 3 is a sectional front elevational view taken along the line III—III of FIG. 1.

A first embodiment according to the present invention is shown in FIGS. 1–3, wherein reference numeral 1 indicates a V-pulley at a drive side. A V-belt 2 is made to under tension between said pulley 1 and a V-pulley at a driven side to effect a power transmission. Here, the V-belt 2 includes a number of V-shaped metal members having slopes 4a and 4a formed at both the sides in the transverse direction to contact with the V-groove 1a of the pulley 1. The metal members are fitted on an endless metal belt 3 which has a plurality of steel bands 3a laminated one on the other, at outwardly open grooves 5 formed in the respective ones of the metal members 4. The metal members are arranged in series in the longitudinal direction of the metal belt 3 so that the respective ones of the metal members are held to abut against the inner side of the metal belt 3 at outward contact surfaces 6 formed in the bottom portions of the grooves 5. Each of roller members 7 such as hollow rollers having a spring action is disposed inside of the metal belt and sandwiched between any two adjacent ones of the metal members and one of stopper members 8 disposed outside of the outer surface of the metal belt 3 is fitted in each of the grooves 5 to prevent the corresponding one of the metal members 4 from coming inside.

Each of the metal members 4 is formed at both its sides in the longitudinal direction of the metal belt 3 with receiving surfaces 9 and 10 for receiving the corresponding one of the roller members 7. Here, according to the present invention, one receiving surface 9 is formed into a recessed arcuate surface having a radius of curvature substantially equal to the radius of the roller members 7, i.e., equal to or slightly larger than the radius, whereas the other receiving surface 10 is formed into a recessed arcuate surface having a radius of curvature larger than that of the one receiving surface 9 so that a wedge effect for pressing the roller members 7 in the longitudinal direction of the metal belt 3 is provided, when each of the metal members 4 is forced into engagement with the V-groove 1a of the pulley 1 by the action of the other receiving surface 10.

In the embodiment as shown, the roller members 7 are spaced from the metal belt 3 so that the contact surfaces 6 may extend through the gaps between the two members 3 and 7 thereby to enlarge the contact area of each of the metal members 4 with the metal belt 3. Moreover, the sum of the depths $l_1$ and $l_2$ of each of the receiving surfaces 9 and 10 is made slightly smaller than the diameter of the roller members 7 so that each of the roller members 7 may be clamped and held between the opposed receiving surfaces 9 and 10 of the adjacent V-shaped metal members 4 and 4.

Next, the operations of the transmission having the construction thus far described will be described. The V-shaped metal members 4 are forced consecutively from a straight running region into engagement with the V-groove 1a of the V-pulley 1 so that it is brought into a revolving region. In this revolving region, an outward reaction is applied to each of the metal members 4 through its side slopes 4a so that the corresponding roller member 7 sandwiched between the adjacent two of the metal members 4 is pressed in the longitudinal direction of the metal belt 3 by the wedge effect caused by the receiving surface 10 having the larger radius of curvature. This pressure acts in the direction to widen the gap between the adjacent two of the metal members 4 thereby to enlarge the radius of curvature of travelling locus provided by each of the metal members 4 as a whole. As a result, the respective ones of the metal members 4 are forced into contact with the metal belt 3 at their outward contact surfaces 6 and firmly into frictional engagement with the same. Thus, the metal belt 3 is revolved integrally with the pulley 1 through the respective ones of the metal members 4 so that a tension is applied to the metal belt 3 to transmit the power to the V-pulley at the driven side.

The operations thus far described are shared with those of the aforementioned previous proposal. In this foregoing proposal, however, since both the receiving surfaces at both the sides of the V-shaped metal members are formed into recessed surfaces having a large radius of curvature, the relative movements of the neighboring V-shaped metal members in the thickness direction of the metal belt are not sufficiently regulated, so that the V-shaped metal members are abruptly pushed toward the metal belt by the outward reaction at the beginning of the transfer from the straight running region to the revolving region whereby they are liable to take unstable positions.

According to the present invention, on the contrary, the radius of curvature of the one receiving surface 9 of the V-shaped metal members 4 is made substantially equal to the radius of the roller members 7, as has been described hereinbefore. On the receiving surface 9, the relative movements of the corresponding ones of the metal members 4 and the roller members 7 in the thick direction of the metal belt 3 are restricted, and the relative movement of the adjacent V-shaped metal members 4 and 4 at the leading and trailing sides of one of the roller members 7 are also restricted to about one half as large as that of the foregoing proposal so that the respective ones of the metal members 4 can be smoothly transferred in stable positions to the revolving region. As seen from FIG. 1, more specifically, provided that V-shaped metal member 4 immediately after it has been transferred to the revolving region is indicated by letter A whereas the V-shaped metal member 4 immediately before the transfer is indicated by letter B, the roller member sandwiched between the members A and B are pressed obliquely backward and outward by the wedge effect of the receiving surface 10 having the larger radius of curvature at the trailing side of the member A, but the member B is brought in this meanwhile into engagement with the roller member 7 by the receiving surface 9 having the smaller diameter of curvature to follow the movement of the roller member 7 in the thick direction of the metal belt 3. As a result, the member B is moved outward to the metal belt 3. In other words, as a result of the restriction of the relative movements of the members A and B in the thick direction of the metal belt 3, the member B accompanies the member A, before it enters the revolving region, to gently move outward so that it comes smoothly into the revolving region without any abrupt outward movement. Then the member B is brought into a predetermined forward inclined position around the roller member 7, while pressing the roller member 7 at the trailing side, so that it can take a uniform position while being prevented from being irregularly inclined.

Incidentally, even in case the receiving surface 9 having the smaller radius of curvature is formed at the trailing side of each of the V-shaped metal members 4, the relative movements of the V-shaped metal members 4 and 4 before and after the roller member 7 are restricted, and their abrupt outward movements at the initial state of their transfer to the revolving region are suppressed so that they can be transferred smoothly to the region.

Thus, according to the present invention, the radius of curvature of one of the receiving surfaces formed at both the sides of each metal member for receiving one of the roller members is made substantially equal to the radius of the roller members is made substantially equal to the radius of the roller members to regulate the relative movements of the metal members and the corresponding one of the roller members in the thickness direction of the metal belt. As a result, the relative movements of the V-shaped metal members adjacent each other through the intervening roller member can be regulated, as compared with that of the foregoing proposal, to prevent the abrupt and irregular movements of the metal members in the outward direction when the metal members are to come into engagement with the V-groove of the V-pulley so that the metal members can be brought smoothly and in the uniform positions into contact with the groove, whereby the power transmission efficiency can be improved.

Figure 4:
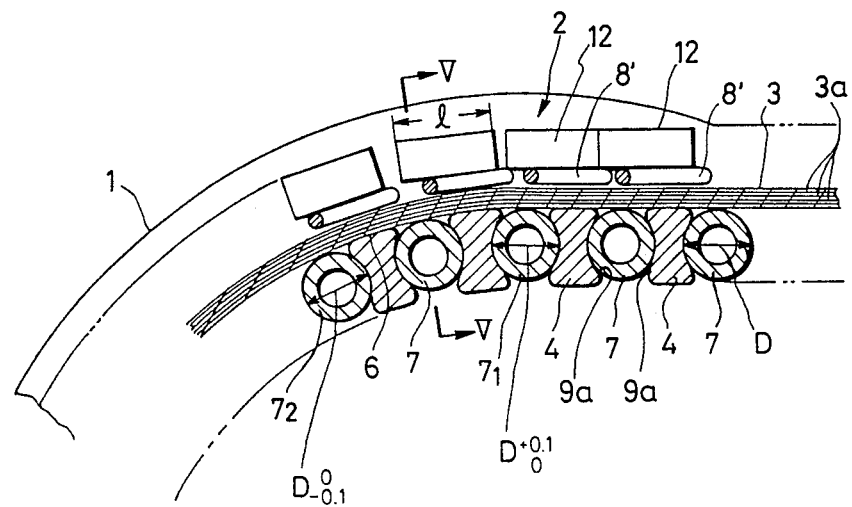
FIG. 4 is a longitudinal section showing a portion of the metal V-belt according to a second embodiment of the invention.
Figure 5:
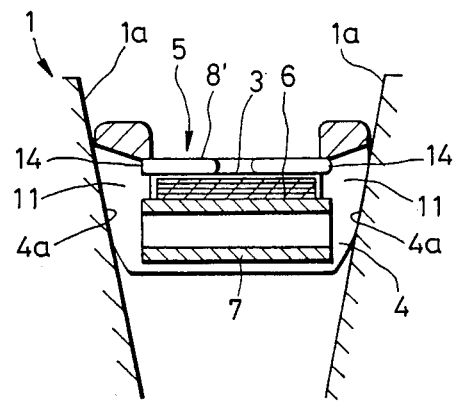
FIG. 5 is a section taken along the line V—V of FIG. 4.
Figure 6:
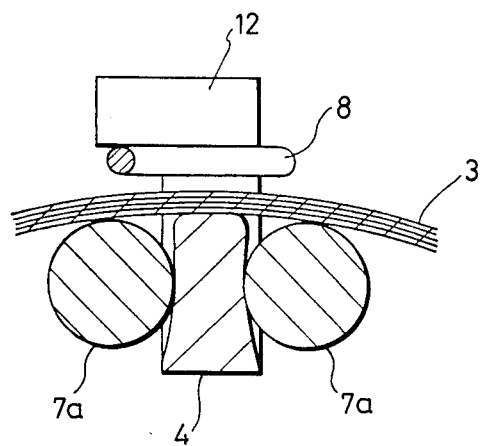
FIG. 6 is a longitudinal section showing the fragments of the metal V-belts according to modified embodiments of the present invention.

A second embodiment according to the present invention is shown in FIGS. 4–6, wherein like parts and components are designated by the same reference numerals and characters as those shown in the first embodiment.

As shown in FIG. 5, the two sides 4a and 4a of the V-shaped metal member 4 are sloped to form together a letter "V" so that they are adapted to come into contact with the two side walls 1a and 1a of the V-shaped groove of the V-pulley 1. The V-shaped member metal member 4 is formed at its outer (i.e., with respect to the endless V-belt 4 as in the following) central portion with a groove 5 which extends in the longitudinal direction of the V-belt 2. This groove 5 has its bottom providing an outward contact surface 6 which is to come into abutment against the inner side of the metal belt 3. In the outer side of the metal belt 3, there is fixed a clip-shaped stopper 8' which is fitted in grooves 14 formed in the inner surface of the two side portions 11 of the V-shaped metal member 4 so that the metal belt 3 is prevented from coming out from the contact surface 6.

The aforementioned two sides 11 of the V-shaped metal member 4 have their outer ends bulging in the longitudinal direction of the V-belt 2 to form bulging portions 12 which have such a thickness, i.e., a length l (FIG. 4) in the aforementioned longitudinal direction as is substantially equal to the pitch of the V-shaped metal members 4 when all of the members 4 are arranged along the metal belt 3. Moreover, the inner portions, i.e., the lower portions, with respect to the metal belt 3 as viewed from the drawing, of the V-shaped metal member 4 are formed with recessed surfaces 9a over at least their most widthwise portions. The rollers 7 are fitted, respectively, in the recessed surfaces 9a of the neighboring two of the V-shaped metal members 4.

The metal V-belt 2 having the construction thus far described is assembled, as has been described hereinbefore, by first fitting all the predetermined number of the V-shaped metal members 4 consecutively or simultaneously on the metal belt 3. In this case, the respective V-shaped metal members 4 are arranged substantially equidistantly along the metal belt 3 by the aforementioned bulging portions 12. Next, the rollers 7 are press-fitted consecutively or simultaneously in the spaces between the aforementioned recessed surfaces 9a of the respective V-shaped metal members 4 thereby to apply a suitable fastening force to the metal belt 3. This fastening force is determined by the size of the total length composed of the V-shaped metal members 4 and the rollers 7 and is established in the metal belt 3 by tensioning the endless metal belt 3 all over its length through the aforementioned outward contact surfaces 6 of the respective V-shaped metal members 4 so that it fasten the metal V-belt 2 as a whole.

In the prior art, the adjustment of the aforementioned whole length is conducted by the V-shaped metal members. Specifically, the desired whole length is attained by connecting a predetermined number of V-shaped metal members having a predetermined thickness. Since, however, the V-shaped metal members has such a special shape as has been described hereinbefore, it is difficult to ensure the accuracy of the thickness with an unavoidable more or less variation. Moreover, there is variation in the inner peripheral length of the metal belt, and it is troublesome for the assembly to adjust the whole length exclusively by the V-shaped metal members, as has been described above, and to impart a suitable fastening force to the metal belt.

Therefore, in the second embodiment of the present device, the rollers 7 are composed of at least two kinds of rollers having different diameters, which are suitably combined to adjust the whole length to apply the suitable fastening force to the metal belt 3.

In the second embodiment, more specifically, the rollers 7 are prepared to have diameters equal to and slightly larger or smaller than a reference size. For example, the rollers 7 having a diameter of the reference size of D mm, rollers 7 having a diameter of D mm (tolerance of 0 to +0.1 mm), and rollers $3_2$ having a diameter of D mm (tolerance of −0.1 to 0 mm) are prepared so that they may be combined to adjust the fastening force of the metal belt 3. In case the number of the rollers is 100, for example, the size adjustment of a pitch of 0.1 mm can be conducted within a range of +10 mm to −10 mm for the reference size of the whole length by the combination of the aforementioned three kinds of rollers.

Thus, by preparing at least one another kind of rollers having a slight size difference in addition to the rollers of the reference size, the fastening force of the metal belt can be freely adjusted. Even if the thickness of the V-shaped metal members is varied, its accuracy is not required because the adjustment of the whole length is conducted by the rollers acting as the intermediate members.

As the intermediate members, moreover, there are used needle rollers having a round section, which are massproduced at present. These needle rollers generally have a high accuracy of 2/1,000 mm and a low production cost.

In the second embodiment thus far described with reference to FIGS. 4 and 5, the intermediate members are exemplified by the cylindrical rollers 7 but can be replaced by solid rollers 7a, as shown in FIG. 6.

As has been described hereinbefore, according to the second embodiment, by making use of the inexpensive intermediate members which can easily ensure their accuracy, it is possible to improve the size accuracy of the metal V-belt and to adjust the fastening force while facilitating the assembly. Of course, the technical teaching according to the second embodiment can be incorporated into the first embodiment, since difference in diameter among rollers 7 is small, i.e., within a range of ±0.1 mm.

While the invention has been described in detail and with reference to specific embodiments thereof, it will be apparent to one skilled in the art that various changes and modifications can be made therein without departing from the spirit and scope of the invention.

What is claimed is:

1. A power transmission V-belt comprising:
   an endless belt mounted between drive and driven pulleys;
   a plurality of V-shaped metal members arranged on said endless belt serially in the longitudinal direction thereof, each of said V-shaped metal members being formed with a groove to provide a contacting surface in contact with an inner surface of said endless belt; and
   a plurality of intermediate members positioned at inner side of said endless belt and each being interposed between neighboring V-shaped metal members, each of said V-shaped metal members having both sides in running direction of said endless belt, and formed with receiving surfaces for receiving one of said roller members, said receiving surfaces being in arcuate form, and the radius of curvature of one of said receiving surfaces being substantially equal to that of said intermediate members, whereas the radius of curvature of the other surface being larger than that of said one receiving surface.

2. A power transmission V-belt as claimed in claim 1, wherein said intermediate members are spaced from said endless belt so that said contacting surface extends between said intermediate member and said endless belt, whereby contacting area between said endless belt and said V-shaped metal member is increased.

3. A power transmission V-belt as claimed in claim 1, wherein said endless belt is formed of a plurality of metal strips.

4. A power transmission V-belt as claimed in claim 1, further comprising a plurality of stop members each disposed at outer sides of said endless belt and connected to each of said V-shaped metal members.

5. A power transmission V-belt as claimed in claim 1, wherein said plurality of intermediate members include at least two kinds of members, one kind being larger than the other kind in running direction of said belt.

6. A power transmission V-belt as claimed in claim 5, wherein said two kinds of members, length difference in running direction is within ±0.1 mm.

* * * * *